Aug. 28, 1962     T. F. SARAH     3,051,409
FISHING REEL CLUTCH

Original Filed Dec. 1, 1959     3 Sheets-Sheet 1

*INVENTOR.*
THOMAS F. SARAH

BY *Ely, Fryer & Hamilton*

ATTORNEYS

Aug. 28, 1962 T. F. SARAH 3,051,409
FISHING REEL CLUTCH

Original Filed Dec. 1, 1959 3 Sheets-Sheet 2

INVENTOR.
THOMAS F. SARAH
BY Ely, Fryer Hamilton
ATTORNEYS

*INVENTOR.*
THOMAS F. SARAH

BY

ATTORNEYS

United States Patent Office 3,051,409
Patented Aug. 28, 1962

3,051,409
FISHING REEL CLUTCH
Thomas F. Sarah, Akron, Ohio, assignor to The Enterprise Manufacturing Company, Akron, Ohio, a corporation of Ohio
Continuation of application Ser. No. 856,505, Dec. 1, 1959. This application Dec. 26, 1961, Ser. No. 162,289
9 Claims. (Cl. 242—84.54)

This application is a continuation of patent application Serial No. 856,505 filed December 1, 1959, and now abandoned.

The invention relates to clutch mechanism for a fishing reel to permit casting a fishing line from the reel without reverse rotation of the crank handle as the line pays out, thus enabling freer casting action with less friction and noise.

In practically all prior clutch mechanisms of which I am aware, once the clutch has been disengaged, mechanism for re-engaging the clutch must be actuated manually. The purpose of the present invention is to provide novel mechanism for automatically re-engaging the clutch by the initial line winding or retrieving movement of the crank handle.

A known prior construction provided means to re-engage the clutch by turning the crank, but such construction required a complicated arrangement of a number of parts. Further, in reels having a level wind mechanism such prior construction required additional gears to operate the level wind mechanism when the clutch was disengaged.

In all known prior constructions, the clutch in engaged position is spring-biased in such a manner that pressure is exerted against the pivot on which the line winding mechanism turns, resulting in increased friction or drag and wear on the relatively moving parts. The present invention overcomes this condition by revolving the spring and the parts it biases as a complete assembly.

Additional objects of the present invention include the provision of a crank-operated clutch mechanism which overcomes the foregoing disadvantages; which is simple and economical in construction; which utilizes one set of gears to retrieve the line and operate the level wind mechanism, and which operates with a minimum of friction and wear on the parts.

These objects and others which will appear from the following specification are accomplished by the improvements comprising the present invention. A preferred form of the invention is shown in the accompanying drawings and described in detail herein as exemplifying the best known mode of practicing the invention, but variations and modifications are embodied within the scope of the claims appended hereto.

Referring to the drawings.

Figure 1:
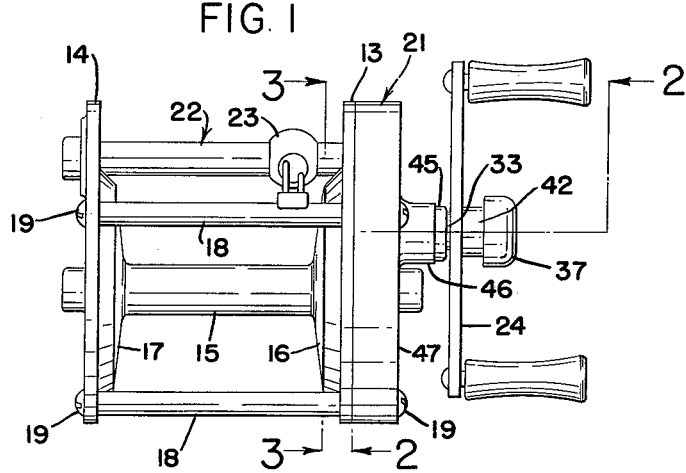
FIG. 1 is a side elevation of a conventional reel with level wind mechanism and embodying the improved clutch mechanism.
Figure 2:
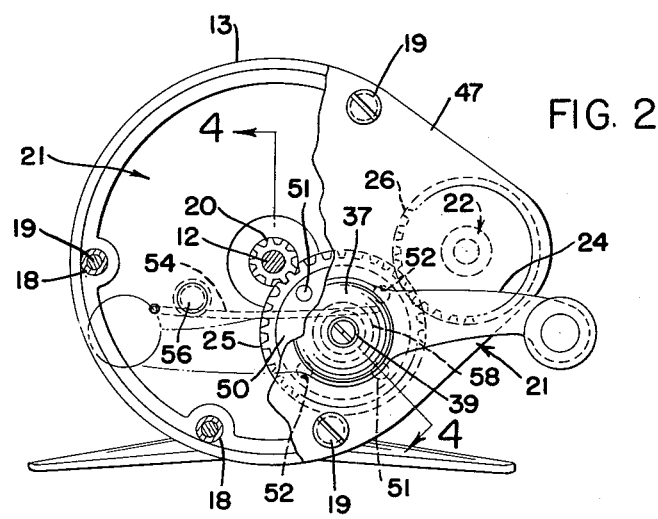
FIG. 2 is a front end elevation partially broken away, as on line 2—2 of FIG. 1.
Figure 3:
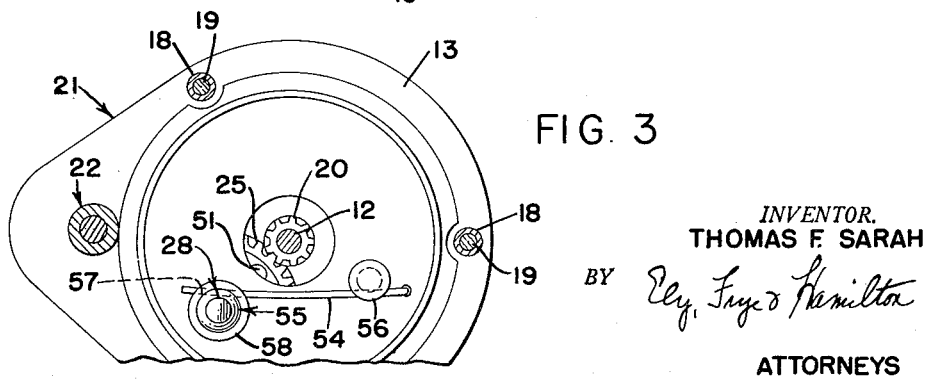
FIG. 3 is a transverse sectional view on line 3—3 of FIG. 1.

The reel shown in FIGS. 1, 2 and 3 has a spool shaft 12 journaled in the front and back plates 13 and 14, and the spool hub 15 has end plates 16 and 17 slidably abutting the front and back plates 13 and 14. The plates are connected to spacer posts 18 by screws 19. The spool hub is secured on spool shaft 12 which has keyed thereon a pinion gear 20 within the gear case 21 attached to the front plate of the reel.

A well-known type of level wind mechanism is indicated at 22 for reciprocating the line guide device 23 as the line is wound on or unwound from the spool hub 15. The crank handle 24 is mounted adjacent the gear case 21 on the shaft which drives a gear 25 meshing with pinion 20, and also meshing with a gear 26 which drives the level wind shaft 22.

Figure 4:
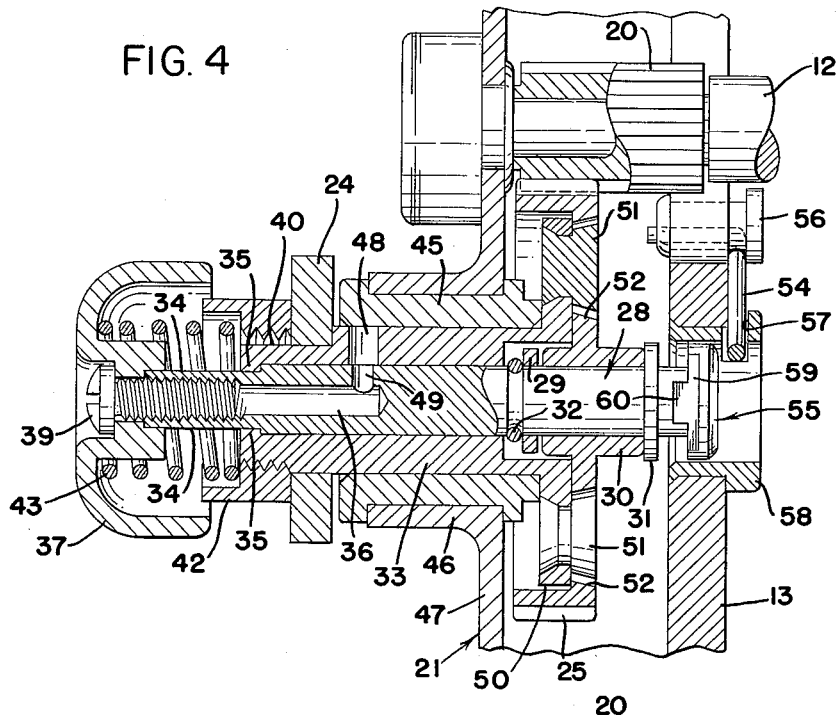
FIG. 4 is an enlarged fragmentary sectional view on line 4—4 of FIG. 2, showing the clutch engaged.
Figure 5:
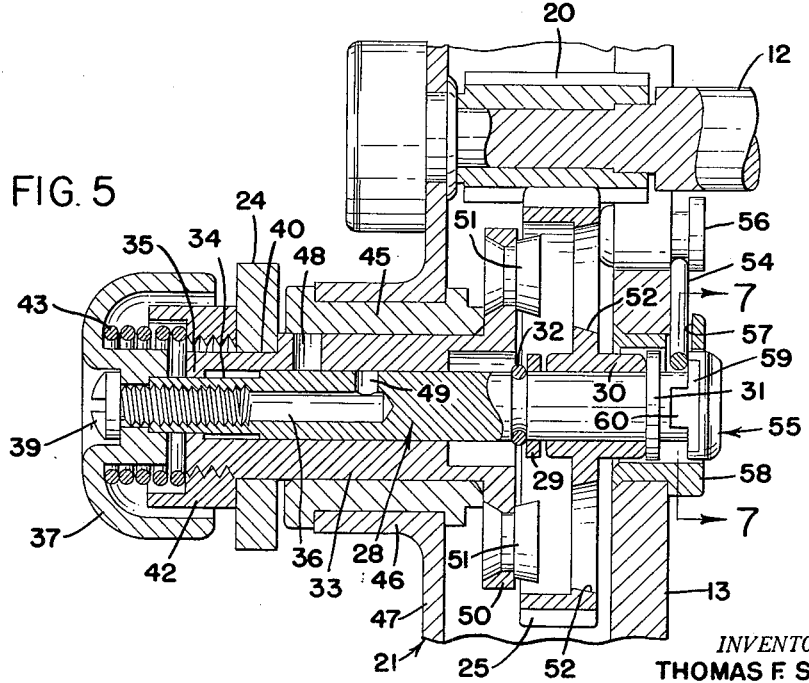
FIG. 5 is a similar view showing the clutch disengaged.

Referring to FIGS. 4 and 5, the gear 25 is journaled on the clutch shaft 28 but is prevented from axial sliding movement on the shaft by the washer 29 at the outer end of gear hub 30 and the collar 31 at the inner end of the hub. Washer 29 is held in place by a snap ring 32 engaged in an annular groove in the shaft. Shaft 28 is axially slidable in a tubular drive shaft 33, and has diametrically opposite flat surfaces 34 along its outer end portion slidably engaged by inturned flanges 35 on the outer end of shaft 33, to prevent rotation of shaft 33 relative to shaft 28.

The outer end of shaft 28 has a counterbore 36 which is internally threaded part of its depth, and a cap 37 fits over the end of the shaft. The cap 37 has a shouldered socket which abuts the end of shaft 28 and a screw 39 secures the cap to the shaft. The tubular drive shaft 33 has a flatted outer end portion 40 on which the crank handle 24 is keyed and held in place by a nut 42 screwed on said portion 40. The outer end of the nut is recessed to receive one end of a compression spring 43, the other end of which abuts the underside of cap 37. Thus, the spring 43 urges the clutch shaft 28 and the gear 25 thereon outwardly toward the position of FIG. 4.

The tubular drive shaft 33 is journaled in a bushing 45 secured in a boss 46 on the cap plate 47 of the gear box, and a lubrication hole 48 through the wall of the shaft is adapted in the position of FIG. 4 to communicate with a lubrication hole 49 in shaft 28 communicating with bore 36. Lubricant may be supplied to the bore 36 by removing screw 39, and lubricating the outer surface of shaft 28 through hole 49 and the outer surface of shaft 33 through hole 48.

The drive shaft 33 has an annular clutch flange 50 on its inner end rotatably abutting the inner end of bushing 45, and diametrically opposite clutch pins 51 are secured to said flange. The clutch pins extend inwardly of the flange 50 and are inwardly divergent, or in other words are tapered radially outwardly, for a purpose to be described. The web of gear 25 is provided with diametrically opposite apertures 52 for receiving pins 51, and the walls of apertures 52 are tapered to match the taper of the pins. Four apertures 52 may be provided with two clutch pins 51. The diameter of said apertures 52 is substantially greater than the diameter of the pins, to facilitate entry of the pins into the holes when the gear is moved toward the clutch flange 50.

When the gear 25 is moved axially outward by movement of shaft 28 urged by spring 43, the web of the gear abuts the inner ends of pins 51, and as one starts to turn the crank the apertures 52 are brought into register with the pins and the gear is snapped to the clutch-engaged position of FIG. 4. The clutch may be quickly disengaged by pressing on the cap 37 to compress spring 43 and move shaft 28 and gear 25 inwardly to the position of FIG. 5 or FIG. 6.

The taper of the pins 51 and the apertures 52 acts to restrain the gear 25 from being accidentally jarred or otherwise disengaged from the pins, momentarily compressing spring 43 and causing the head 55 of shaft 28 to wedge or cam under the latch bar.

The latch mechanism for holding the clutch disengaged is operated by turning the crank handle to cause re-engagement of the clutch, and comprises a latch bar 54 adapted to resiliently engage under the head 55 on the inner end of shaft 28. The latch bar 54 is preferably a spring bar secured at one end in the front plate 13 and held by a stud 56, and having its free end yieldingly pressing radially inwardly toward shaft 28 and through a notch 57 in a bushing 58 in plate 13 surrounding head 55. The free end of bar 54 is in position to engage the outer periphery of the head and the head 55 is tapered on its inner end to slide under the bar 54 when the cap 37 is pressed to move shaft 28 from the position of FIG. 4 to the position of FIG. 5 or FIG. 6.

Figure 11:
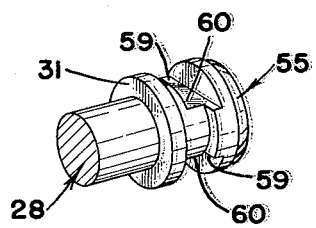
FIG. 11 is a perspective view showing the inner end of the drive shaft.

In the position of FIG. 5, the bar is engaged behind the head 55 to latch the shaft 28 and gear 25 in disengaged relation to the drive pins 51 against the compression of spring 43. Consequently, the gear 25 and spool shaft 12 intermeshed therewith are free to rotate without turning the handle when a cast is made to pay out the line. The means for causing re-engagement of the clutch when the handle is turned to start retrieving the line is a pair of transverse cam slots 59 cut in diametrically opposite sides of the head and extending axially of the shaft to form flat surfaces 60 thereon (FIG. 11).

Figure 6:
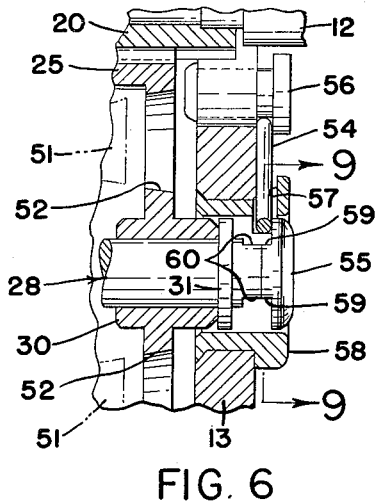
FIG. 6 is a fragmentary sectional view similar to FIG. 5 showing the drive shaft rotated 90°.
Figure 7:
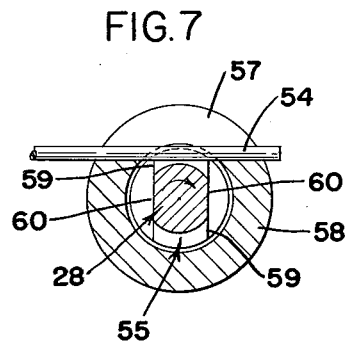
FIG. 7 is a fragmentary sectional view on line 7—7 of FIG. 5.
Figure 8:
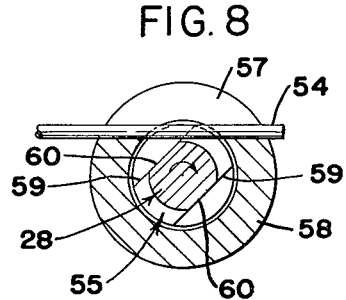
FIG. 8 is a similar view showing the shaft rotated 45°.
Figure 9:
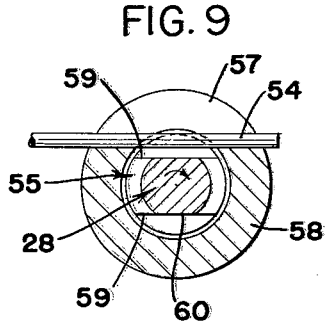
FIG. 9 is a similar view on line 9—9 of FIG. 6 showing the shaft rotated 90°.
Figure 10:
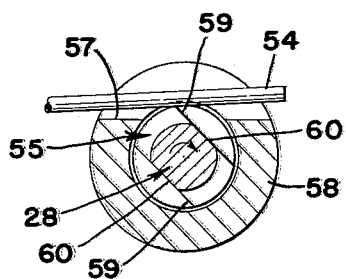
FIG. 10 is a similar view showing the shaft rotated 135°.

In operation, if the bar 54 is holding the clutch disengaged by engaging behind the head between the opposite axially extending flat surfaces 60, as shown in FIGS. 5 and 7, as the handle is turned to rotate the shaft 28 clockwise as indicated in FIG. 8, when the shaft has been rotated substantially 90° the bar will move into registry with a slot 59 and the spring 43 will move the shaft axially to abut the inner end of the slot against the bar in the position of FIGS. 6 and 9. As the shaft is rotated further in a clockwise direction, the outer corner of slot 59 cams the bar radially outward to the position of FIG. 10 where the spring moves the head axially outward past the bar and the gear 25 into position to engage the pins 51 when the pins are rotated into registry with apertures 52.

By having the slots flat surfaces 60 into the shaft 28 and extending axially into the head 55, the latch bar 54 will always engage behind the head 55 when cap 37 is pushed inward to disengage the gear 25 regardless of what rotated position the shaft is in. If it is in the positions of FIGS. 7 or 8, the bar 54 will engage behind the head between the slots 59, and if it is in the position of FIG. 9 the bar will engage behind the head within one of the slots 59. If there were no slot provided, once the bar dropped behind the head it would not be released by rotation of the shaft, and if the slot in the head did not extend axially of the shaft as at 60, there might be a burred edge formed which would prevent the bar from entering the slot 59.

The device of the present invention provides for automatically re-engaging the clutch by the intial retrieving movement of the crank handle under any and all conditions. When the clutch is engaged and the line is being retrieved the spring 43 is expanded and revolves with the shafts 28 and 33 and crank handle 41 as an assembly of parts, so that no spring pressure is applied between the rotating parts and a stationary pivot which would result in increased drag and wear. Moreover, the mechanism is simple and economical, and is fully adapted for reels having level wind mechanisms without requiring additional gearing.

What is claimed is:

1. In a fishing reel having a frame, a spool shaft journaled in the frame, a pinion gear on said shaft, and a crank handle for turning the spool shaft to retrieve the line, clutch mechanism for operatively connecting said handle to and disconnecting it from said spool shaft comprising a hollow drive shaft keyed to said handle and journaled in said frame, a clutch element on said shaft, a clutch shaft axially slidable and non-rotatable in said drive shaft, a drive gear non-slidably journaled on said clutch shaft engageable with said clutch element and splined to said pinion gear, a spring urging said clutch shaft and drive gear to clutch-engaging position, a head on the inner end of said clutch shaft, and a spring latch bar on said frame for engaging said head to hold said gear disengaged from said clutch element.

2. In a fishing reel having a frame, a spool shaft journaled in the frame, a pinion gear on said shaft, and a crank handle for turning the spool shaft to retrieve the line, clutch mechanism for operatively connecting said handle to and disconnecting it from said spool shaft comprising a hollow drive shaft keyed to said handle and journaled in said frame, a clutch element on said shaft, a clutch shaft axially slidable and non-rotatable in said drive shaft, a drive gear non-slidably journaled on said clutch shaft engageable with said clutch element and splined to said pinion gear, a spring urging said clutch shaft and drive gear to clutch-engaging position, a head on the inner end of said clutch shaft, and a spring latch bar on said frame for engaging said head to hold said gear disengaged from said clutch element, and said head having a transverse slot for receiving said latch bar and for releasing said latch bar as said clutch shaft is rotated.

3. In a fishing reel having a frame, a spool shaft journaled in the frame, a pinion gear on said shaft, and a crank handle for turning the spool shaft to retrieve the line, clutch mechanism for operatively connecting said handle to and disconnecting it from said spool shaft comprising a hollow drive shaft keyed to said handle and journaled in said frame, a clutch element on said shaft, a clutch shaft axially slidable and non-rotatable in said drive shaft, a drive gear non-slidably journaled on said clutch shaft engageable with said clutch element and splined to said pinion gear, a spring urging said clutch shaft and drive gear outwardly to clutch-engaging position, a spring latch bar on said frame, and means on the inner end of said clutch shaft to engage behind said latch bar when said clutch shaft is pushed inwardly and to release the latch bar when said clutch shaft is rotated.

4. In a fishing reel having a frame, a spool shaft journaled in the frame, a pinion gear on said shaft, and a crank handle for turning the spool shaft to retrieve the line, clutch mechanism for operatively connecting said handle to and disconnecting it from said spool shaft comprising a hollow drive shaft keyed to said handle and journaled in said frame, a clutch element on said shaft, a clutch shaft axially slidable and non-rotatable in said drive shaft, a drive gear non-slidably journaled on said clutch shaft engageable with said clutch element and splined to said pinion gear, a spring urging said clutch shaft and drive gear outwardly to clutch-engaging position, and cooperating latch means on said frame and the inner end of said clutch shaft to hold said clutch shaft in clutch-disengaged position when said shaft is pushed inwardly against said spring and to release said clutch shaft when it is rotated.

5. In a fishing reel having a frame, a hollow drive shaft journaled in said frame, a crank handle on said drive shaft, a clutch element on the inner end of said drive shaft, a clutch shaft axially slidable and non-rotatable in said drive shaft, a drive gear journaled on said clutch shaft inwardly of said clutch element and engageable therewith, a spring urging said clutch shaft and drive gear outwardly to clutch-engaging position, a spring latch bar on the frame for engaging the inner end of said clutch shaft, and a head on said clutch shaft to engage behind said latch bar to hold the gear disengaged from said clutch element.

6. In a fishing reel having a frame, a hollow drive shaft journaled in said frame, a crank handle on said drive shaft, a clutch element on the inner end of said drive shaft, a clutch shaft axially slidable and non-rotatable in said drive shaft, a drive gear journaled on said clutch shaft inwardly of said clutch element and engageable therewith, a spring urging said clutch shaft and drive gear outwardly to clutch-engaging position, a spring latch bar on the frame for engaging the inner end of said clutch shaft, and a head on said clutch shaft to engage behind said latch bar to hold the gear disengaged from said clutch element, and said head having a slot for receiving said latch bar and for automatically releasing said bar when the clutch shaft is rotated.

7. In a fishing reel having a frame, a hollow drive shaft journaled in said frame, a crank handle on said drive shaft, a clutch element on the inner end of said drive shaft, a clutch shaft axially slidable and non-rotatable in said drive shaft, a drive gear journaled on said clutch shaft inwardly of said clutch element and engageable therewith, a spring urging said clutch shaft and drive gear outwardly to clutch-engaging position, and cooperating latch means on said frame and said clutch shaft to hold said drive gear disengaged from said clutch element when said clutch shaft is pushed inwardly, and to release said drive gear for engagement with said clutch element when the clutch shaft is rotated.

8. In a fishing reel having a frame, a hollow drive shaft journaled in said frame, a crank handle on said drive shaft, a clutch element on the inner end of said drive shaft, a clutch shaft axially slidable and non-rotatable in said drive shaft, a drive gear journaled on said clutch shaft and engageable with said clutch element, a spring urging said clutch shaft and drive gear toward clutch-engaging position, a spring-biased latch bar on the frame for engaging said clutch shaft, and means on said clutch shaft to engage behind said latch bar when said clutch shaft is pushed inwardly to hold said drive gear disengaged and to release said latch bar when said clutch shaft is rotated.

9. In a fishing reel having a frame, a hollow drive shaft journaled in said frame, a crank handle on said drive shaft, a clutch shaft axially slidable and non-rotatable in said drive shaft, a drive gear, a clutch element on said drive gear, a mating clutch element on at least one of said relatively non-rotatable shafts, said drive gear being journaled on said clutch shaft for rotation relative thereto when said clutch elements are disengaged, said drive gear being rotatable with said clutch shaft when said clutch elements are engaged, axial displacement of said clutch shaft selectively engaging and disengaging said clutch elements, a spring urging said clutch shaft to engaging position, a spring latch bar on the frame for engaging said clutch shaft, and a head on said clutch shaft to engage behind said latch bar to hold said clutch shaft in disengaged position.

References Cited in the file of this patent

UNITED STATES PATENTS

| | | |
|---|---|---|
| 1,547,238 | Russell et al. | July 28, 1925 |
| 1,577,812 | Robinson et al. | Mar. 23, 1926 |
| 2,184,149 | Marr | Dec. 19, 1939 |
| 2,568,245 | McDonald | Sept. 18, 1951 |
| 2,896,876 | Bogar | July 28, 1959 |